(12) United States Patent
Doretto et al.

(10) Patent No.: US 8,184,915 B2
(45) Date of Patent: May 22, 2012

(54) DEVICE AND METHOD FOR FAST COMPUTATION OF REGION BASED IMAGE FEATURES

(75) Inventors: Gianfranco Doretto, Albany, NY (US); Xiaogang Wang, Cambridge, MA (US); Thomas B. Sebastian, Flemington, NJ (US); Jens Rittscher, Ballston Lake, NY (US); Peter H. Tu, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1203 days.

(21) Appl. No.: 11/987,785

(22) Filed: Dec. 4, 2007

(65) Prior Publication Data

US 2008/0187220 A1  Aug. 7, 2008

Related U.S. Application Data

(60) Provisional application No. 60/868,407, filed on Dec. 4, 2006, provisional application No. 60/960,545, filed on Oct. 3, 2007.

(51) Int. Cl.
*G06K 9/62* (2006.01)
(52) U.S. Cl. ............... 382/224; 382/228; 382/181
(58) Field of Classification Search .............. 382/100, 382/103, 106, 107, 190, 208, 224, 228
See application file for complete search history.

(56) References Cited

U.S. PATENT DOCUMENTS

| | | | |
|---|---|---|---|
| 7,574,037 B2 * | 8/2009 | Hidai et al. ............ | 382/159 |
| 2005/0102246 A1 * | 5/2005 | Movellan et al. ......... | 706/12 |
| 2006/0072811 A1 * | 4/2006 | Porter et al. ........... | 382/159 |
| 2006/0177131 A1 * | 8/2006 | Porikli ................ | 382/168 |

OTHER PUBLICATIONS

S. Belongie, J. Malik, and J. Puzicha. Shape matching and object recognition using shape contexts. *IEEE TPAMI*, 24:509-522, 2002.
N. Dalai and B. Triggs. Histograms of oriented gradients for human detection. In *CVPR*, vol. 1, pp. 886-893, Jun. 20-25, 2005.
G. Doretto, X. Wang, T.B. Sebastian, J. Rittscher, and P. Tu. Shape and appearance context modeling: A fast framework for matching the appearance of people. Technical Report 2007GRC594, GE Global Research, Niskayuna, NY, USA, 2007.
L. Fei-Fei and P. Perona. A Bayesian hierarchical model for learning natural scene categories. In *CVPR*, vol. 2, pp. 524-531, Jun. 20-25, 2005.
B.V. Funt and G. D. Finlayson. Color constant color indexing. *IEEE TPAMI*, 17:522-529, 1995.
N. Gheissari, T. B. Sebastian, P. H. Tu, J. Rittscher, and R. Hartley. Person reidentification using spatiotemporal appearance. In *CVPR*, vol. 2, pp. 1528-1535, 2006.
Y. Guo, S. Hsu, Y. Shan, H. Sawhney, and R. Kumar, Vehicle fingerprinting for reacquisition & tracking in videos. In *CVPR*, vol. 2, pp. 761-768, Jun. 20-25, 2005.

(Continued)

*Primary Examiner* — Brian Q Le
*Assistant Examiner* — Edward Park
(74) *Attorney, Agent, or Firm* — Oliff & Berridge, PLC (57) ABSTRACT

A device and method for efficient computation of statistical information, such as a mean, co-variance, or histogram of the image pixels, over discrete image regions. The computation employs integral computations to determine the statistical information over image regions of arbitrary shape, including irregular polygonal shaped regions. The integral computations are simplified by categorizing corner points of boundaries of image regions. The computation can be applied to calculate descriptors or signatures of persons or objects within an image. The computation also has a low computational cost enabling fast calculation of image statistics.

21 Claims, 7 Drawing Sheets

OTHER PUBLICATIONS

J. Huang, S. R. Kumar, M. Mitra, W.-J. Zhu, and R. Zabih. Image indexing using color correlograms. In *CVPR*, pp. 762-768, San Juan, Jun. 17-19, 1997.

O. Javed, K. Shafique, and M. Shah. Appearance modeling for tracking in multiple non-overlapping cameras. In *CVPR*, vol. 2, pp. 25-33, Jun. 20-25, 2005.

S. Kumar and M. Hebert. Discriminative random fields. *IJCV*, 68:179-201, 2006.

S. Lazebnik, C. Schmid, and J. Ponce. Affine-invariant local descriptors and neighborhood statistics for texture recognition. In *ICCV*, pp. 649-655, 2003.

D. Lowe. Distinctive image features from scale-invariant key points. *IJCV*, 60:91-110, 2004.

X. Ma and W.E. L. Grimson. Edge-based rich representation for vehicle classification. In *CVPR*, vol. 2, pp. 1185-1192, Oct. 17-21, 2005.

K. Mikolajczyk and C. Schmid. A performance evaluation of local descriptors. *IEEE TPAMI*, 27:1615-1630, 2005.

H. Moon and P. J. Phillips. Computational and performance aspects of PCA-based face-recognition algorithms. *Perception*, 30(3):3003-321, 2001.

G. Mori and J. Malik. Recovering 3d human body configurations using shape contexts. *IEEE TPAMI*, 28(7):1052-1062, Jul. 2006.

O. C. Ozcanli, A. Tamrakar, B. B. Kimia, and J. L. Mundy. Augmenting shape with appearance in vehicle category recognition. In *CVPR*, vol. 1, pp. 935-942, New York, NY, USA, 2006.

F. Porikli. Integral histogram: a fast way to extract histograms in cartesian spaces. In *CVPR*, vol. 1, pp. 829-836, Jun. 20-25, 2005.

S. Savarese, J. Winn, and A. Criminisi. Discriminative object class models of appearance and shape by correlations. In *CVPR*, vol. 2, pp. 2033-2040, 2006.

B. Schiele and J. L. Crowley. Recognition without correspondence using multidimensional receptive field histograms. *IJCV*, 36(1):31-50, 2000.

J. Shotton, J. Winn, C. Rother, and A. Criminisi. Textonboost: Joint appearance, shape and context modeling for multi-class object recognition and segmentation. In *ECCV*, pp. 1-15, 2006.

O. Tuzel, F. Porikli, and P. Meer, Region covariance: A fast descriptor for detection and classification. In *ECCV*, pp. 589-600, 2006.

M. Varma and A. Zisserman. A statistical approach to texture classification from single images. *IJCV*, 62:61-81, 2005.

A. Vedaldi and S. Soatto. Local features, all grown up. In *CVPR*, vol. 2, pp. 1753-1760, 2006.

P. Viola and M. J. Jones. Robust real-time face detection. *IJCV*, 57:137-154, 2004.

J. Winn, A. Criminisi, and T. Minka. Object catergorization by learned universal visual dictionary. In *ICCV*, vol. 2, pp. 1800-1807, Oct. 17-21, 2005.

L. Wolf and S. Bileschi. A critical view of context. *IJCV*, 69(2):251-261, Aug. 2006.

Q. Zhao and H. Tao. Object tracking using color correlogram. In *VS-PETS*, pp. 263-270, Oct. 15-16, 2005.

\* cited by examiner

DEVICE AND METHOD FOR FAST COMPUTATION OF REGION BASED IMAGE FEATURES

CROSS-REFERENCE TO RELATED APPLICATION

The present application claims priority to U.S. Provisional Patent Application No. 60/868,407, which was filed on Dec. 4, 2006, and U.S. Provisional Patent Application No. 60/960,545, which was filed on Oct. 3, 2007, the disclosures of which are incorporated herein by reference in their entireties. The co-pending application entitled "Image Processing for Person and Object Re-Identification" (application Ser. No. 11/987/777) that is being filed concurrently herewith, is additionally incorporated herein by reference in its entirety.

BACKGROUND

The present disclosure relates generally to a device and method for computing image features over discrete image regions, and more particularly for computing image features over regions having an arbitrary non-simply connected rectangular shape.

Integral image and integral histogram computations (sometimes referred to herein as "integral computations") can be used to compute image statistics, such as mean, co-variance and histogram for a set of pixels in a simple rectangular image region.

An exemplary integral image computation is an aggregate function where, starting from an origin point in a set of image data and traversing the through the remaining points along a scan-line, the image values are summed so that each point has a cumulative value that represents the sum of the previously scanned adjacent points and the current point being scanned. An integral image representation can be created which is a representation of the cumulative image data for all the data points in the image.

The integral image representation T of an image I can be illustrated with reference to FIG. 7. In this Figure, T(x, y) is the sum over the rectangular region between the origin (1, 1) and (x,y) of the values of I, and can be computed with the following equation:

$$T(x, y) = \sum_{u=1}^{x} \sum_{v=1}^{y} I(u, v) \quad (1)$$

Figure 7:
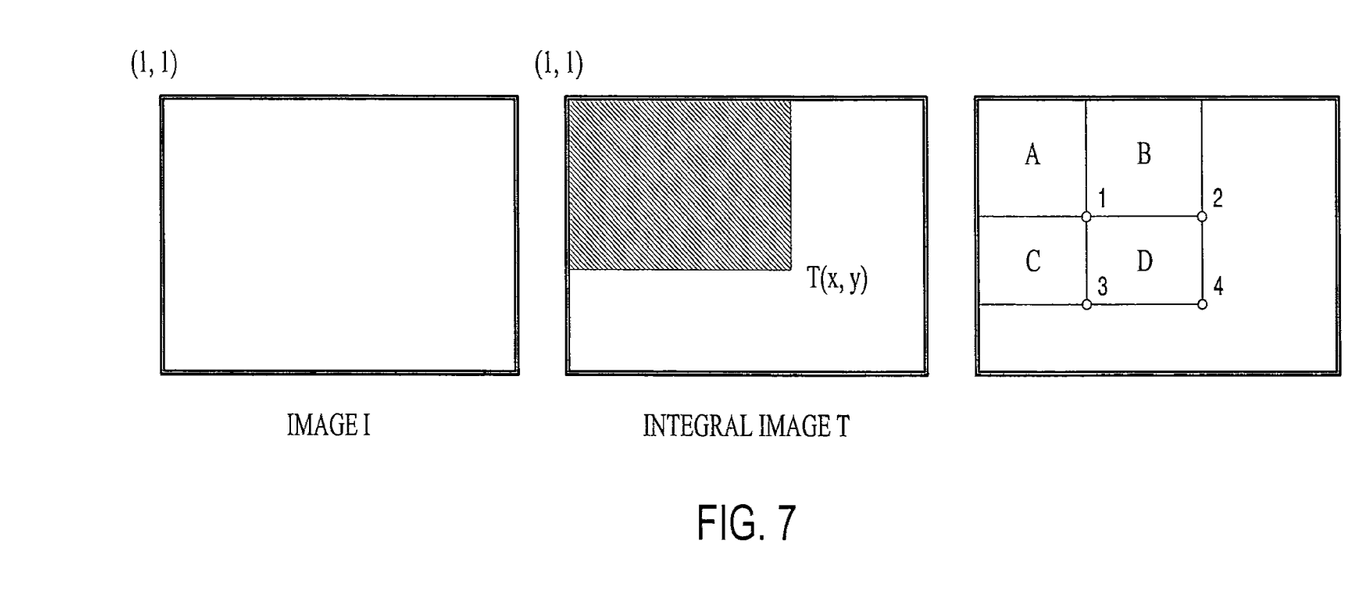
FIG. 7 is a schematic diagram illustrating an integral image representation.

The integral image representation can be used to efficiently calculate the sum of I, over rectangle D shown in FIG. 7. The sum of I over D can be computed as Sum(D)=T(1)+T(4)−T(2)−T(3), where T(1), T(2), T(3) and T(4) refer to the integral image data at corner points 1, 2, 3 and 4, respectively. Thus, integral image representations can be useful because the sum of pixel intensities or other image values can be computed over any rectangular region of the image by referring to only the four corner points of the integral image representation.

The use of image integral representations for face detection is described in P. Viola and M. J. Jones, "Robust Real-Time Face Detection," IJCV, vol. 57, pages 137-154 (2004), the disclosure of which is incorporated herein by reference in its entirety.

An integral histogram computation can be calculated similarly, where the integral histogram is iterated at the current data point using the histograms of the previously scanned adjacent data points. At each point, the value of the bin that the point fits into is increased in the bin's range. After the integral histogram representation of the image is computed, histograms of rectangular target regions can be computed by using the integral histogram values at the corner points of the rectangular target region. The integral histogram of the target regions is calculated similarly to the image integral representation discussed above.

The use of integral histogram computations is described in F. Porikli, "Integral Histogram: a Fast Way to Extract Histograms in Cartesian Spaces," CVPR, vol. 1, pp. 829-836 (Jun. 20-25, 2005), the disclosure of which is incorporated herein by reference in its entirety.

SUMMARY

Using integral image computations to calculate region based features can be more efficient than using the original image itself because the overall computational cost is lowered.

The use of integral computations including image integral computations and integral histogram computations have been limited to computing the sum of the image data over simply connected rectangular regions having only four corners (referred to herein simply as "rectangular"). This limitation can prevent the use of integral computations for more complex, non-simply connected rectangular regions (referred to herein as "generalized rectangular"). This is a drawback because image data generally represents an array of pixels that includes generalized rectangular regions rather than simple rectangular regions.

It has been discovered in connection that integral computations, such as integral image and integral histogram, can be used over generalized rectangular regions in addition to rectangular regions. The use of integral computations over generalized rectangular regions can enable the fast computations of statistics (e.g. mean and co-variance) of multidimensional vector-values functions over (discrete) regions having arbitrary shape.

According to a first aspect of the present disclosure, there is provided an image statistic computation device for computing region-based image statistics from an inputted image, where the device includes a propagation device, a target region recognition device, a corner analyzing device and a computation device. The propagation device can be configured to produce a cumulative image representation by propagating an aggregate function through image data from the inputted image, where each data point in the cumulative image representation includes cumulative image information that is based on a value of previously propagated adjacent points as well as a value of the data point. The target region recognition device can be configured to identify a generalized rectangular region from the cumulative image representation. The corner analyzing device can be configured to identify and characterize each corner of identified generalized rectangular region. The computation device can calculate statistical information over the at least one generalized rectangular region based on the type of each corner and based on the cumulative image information at each corner.

In another aspect, a method for computing statistical information over a region in image data from an inputted image, the method including producing a cumulative image representation by propagating an aggregate function through the image data, identifying a generalized rectangular region in the cumulative image representation, identifying corners of the generalized rectangular region, characterizing the type each corner of the generalized rectangular region, assigning a value to each corner based on the type of each corner, and computing statistical information over the generalized rectangular region based on the value assigned to each corner of the generalized rectangular region and the cumulative image information at each corner of the generalized rectangular region.

The present disclosure also can provide a method for calculating an identifying descriptor for a person or object in an image, where the method includes calculating an appearance labeled image from image data taken from an image, creating a cumulative image representation by propagating an aggregate function through the appearance labeled image, identifying a first generalized rectangular region from the cumulative image representation, identifying and characterizing the corners of the first generalized rectangular region, and calculating a first image statistic over the first generalized rectangular region based on the cumulative image information of each corner and based on the type of each corner.

In another embodiment, an identifying descriptor can be calculated by calculating a shape labeled image from the image data, identifying a second generalized rectangular region from the shape labeled image, identifying and characterizing the corners of the second generalized rectangular region, identifying the portions of a cumulative image representation of an appearance labeled image that correspond to the corners of the second generalized rectangular region, and calculating a second image statistic over the second generalized rectangular region based on the type of each corner of the second generalized region and the first image statistic calculated at each data point of the cumulative image representation that corresponds to a corner of the second generalized rectangular region.

BRIEF DESCRIPTION OF THE DRAWINGS

Exemplary embodiments are described in detail below with reference to the accompanying drawings in which.

DETAILED DESCRIPTION OF EMBODIMENTS

Exemplary embodiments of the broad principles outlined herein are described with reference to the various drawings.

Figure 1:
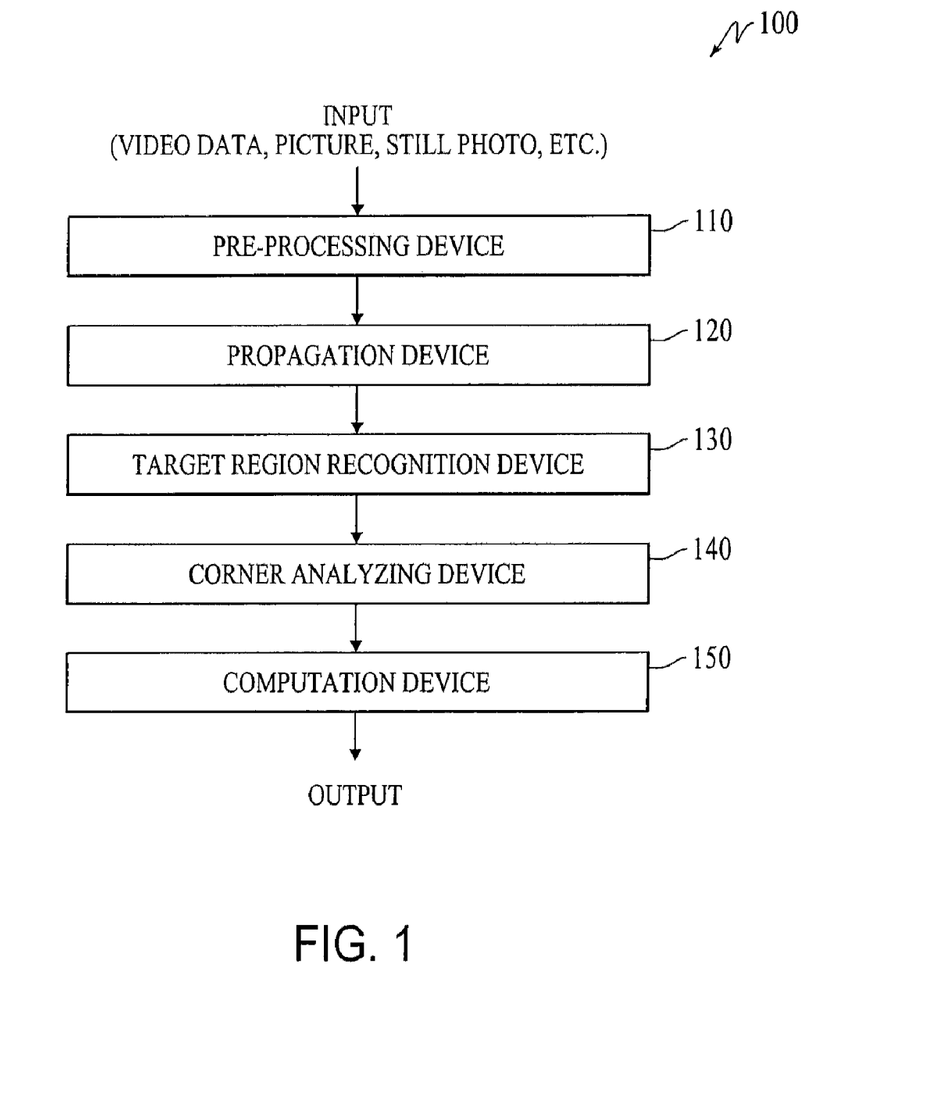
FIG. 1 is a block diagram of an exemplary device for calculating region based image features.

FIG. 1 shows a block diagram of an exemplary image statistic computation device 100 that can be used to calculate region based image features. The device 100 can include a pre-processing device 110, a propagation device 120, a target region recognition device 130, a corner analyzing device 140, and a computation device 150. During operation, the image statistic computation device 100 receives input, such as an image captured by a camera, and processes the image to compute features over target regions of the image.

The pre-processing device 110 can receive an input image, such as video images or still photos. From the input image, the pre-processing device 110 can be used to process the image data by converting the data, if necessary, into a predetermined format for the propagation device 120. The pre-processing device transmits the converted image data to the propagation device 120.

The propagation device 120 receives the image data from the pre-processing device 110 and propagates an aggregated function through the image data to convert the image data processed in pre-processing device 110 into a cumulative image representation where each point in the cumulative image representation includes cumulative data that is based on a value of adjacent data points processed before it, as well as a value of the data point itself. The cumulative image representation created by the propagation device 120 is then transmitted to a target region recognition device 130.

The target region recognition device 130 receives the cumulative image representation from the propagation device 120, and identifies a generalized rectangular region within the cumulative image representation. The generalized rectangular region can be a region of interest that is selected so that image features over the region can be calculated. The generalized rectangular region identified by the target region recognition device 130 is transmitted to the corner analyzing device 140.

The corner analyzing device 140 receives the generalized rectangular region from the target region recognition device 130 and analyzes the generalized rectangular region to identify and characterize a corner point of the region as one of a predefined corner type. The corner analyzing device 140 transmits the corner type information for each corner point to the computation device 150.

The computation device 150 receives the corner information from the corner analyzing device 140 and calculates image statistics over the generalized rectangular region of the cumulative image representation by considering the value of the cumulative image representation at the corners of the generalized rectangular region and the corner type information of each corner. The computation device 150 can output the calculated image statistic. The outputted statistic can be output to a display, a memory or can be used in further processing, for example. The statistics computed over the generalized rectangular regions can be used in any application where it is desired to calculate image data over certain target regions of an image.

In an example of operation of an image statistic computation, the pre-processing device 110 can receive image data from an input image and process the image data to convert the image data into any form that is necessary for subsequent processing. For example, the cumulative image representation that is subsequently calculated in the propagation device 120 can be based on color or brightness data from the pixels, or can be based on pixel data that is converted into more complex forms. For example, the pre-processing device can be used to convert pixel data from RGB data into Log-RGB color space data, Lab color space data, HSV data or YIQ data. The pre-processing device can process the image data to extract and normalize pixels of interest, for example, those capturing people or objects of interest. The pre-processing device can be used to calculate more complex image statistics such as the histogram of the oriented gradient (HOG) values. The pre-processing device can filter the pixel data, and quantize and label the pixel data. The pre-processing device can be used to convert the image data into even more complex formats, for example, to create shape labeled images and appearance labeled images, as described in greater detail in co-pending U.S. patent application entitled "Image Processing for Person and Object Re-Identification." The pre-processing device 110 transmits the processed image data to the propagating device 120.

The propagating device 120 can receive the image data processed in the pre-processing device 110 and further process the data to create a cumulative image representation. The propagation device 120 can create the cumulative image representation by propagating an aggregate function through the image data, starting from an origin point in the data and traversing through remaining points of the image data along a scan-line, to propagate the aggregate function over the image data. The aggregate function at each data point (typically each pixel) uses the values of the aggregated function from adjacent data points that were previously processed. The propagation device 120 can propagate the aggregate function on a pixel-by-pixel basis.

The aggregate function can include integral computations, such as integral image and integral histogram. For example, as discussed above, the integral image function can be used to propagate the sum of the image intensities or other image features throughout the image data, and the integral histogram function can be used to propagate a cumulative histogram of image features throughout the image data.

The propagation device 120 can propagate the aggregate function throughout the image data along scan-lines to produce a cumulative image representation that includes cumulative image data at each point. The image data is typically scanned starting from the top-left of the image, propagating the aggregate function from left to right, and then returning to the left side of the next row of pixels until data from each pixel is converted into cumulative image data including the values of previously processed adjacent pixels in addition to the value of the pixel being scanned. Thus, for a left-to-right propagation, the cumulative image representation at a given data point will hold the sum of all values to the left and above of the point including the value of the point itself. Cumulative image representations can be produced by propagating an aggregate function along a scan-line in any suitable sequence. For example, the principles outlined in this disclosure could readily be adapted to form a cumulative image representation that is produced by scanning up-to-down along the image data. The cumulative image representation created by the propagation device 120 can be transmitted to the target region recognition device 130.

Figure 2A:
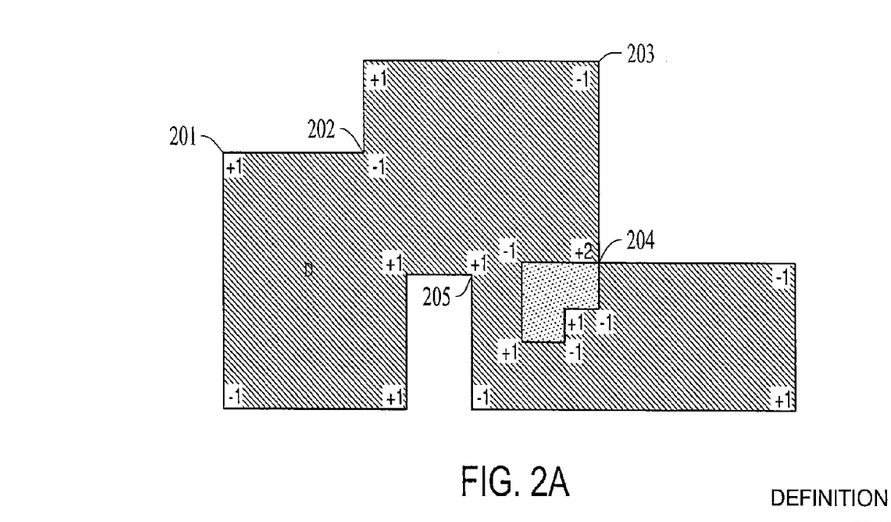
FIGS. 2A-2B are diagrams illustrating an exemplary planar generalized rectangular region with values assigned to each corner point based on the type of corner.

The target region recognition device 130 can receive the cumulative image representation from the propagation device 120. The target region recognition device 130 can be configured to identify a region of interest in the cumulative image representation received from the propagation device 120. The target region recognition device can identify a generalized rectangular region. The generalized rectangular region is a non-simply connected rectangle, such that the boundaries of the generalized rectangular region are made of a collection of portions of a finite number of hyperplanes that are perpendicular to one of the axes of a reference coordinate system. The generalized rectangular region identified by the target region recognition device 130 represents a region over which image features will be computed. Referring to FIG. 2A, for example, the target region recognition device 130 can identify a generalized rectangular region D from the cumulative image representation. In FIG. 2A, a generalized rectangular region D is illustrated where the diagonal hashed area represents image points belonging to region D. In the embodiment illustrated in FIG. 2A, the dotted area represents a "hole" in region D.

The target region recognition device 130 can be configured to identify existing regions in the cumulative image representation that are defined by a common feature, for example, or can be configured to select specific regions of a predetermined shape and/or location from the cumulative image representation. The target region recognition device 130 can also be configured to identify generalized rectangular regions of any shape. For example, the target region can be a generalized rectangular region that has no holes. Similarly, the target recognition device can be configured to identify multiple generalized rectangular regions, generalized rectangular regions with multiple holes, simply-connected rectangular regions, and any combination of the foregoing. Additionally, while the generalized rectangular region illustrated in FIG. 2A is a two-dimensional region, the target recognition device 130 can identify generalized rectangular regions for image data of any dimension. In particular, three dimensional rectangular regions may be useful in image analysis. The target region recognition device 130 can transmit the generalized rectangular region to the corner analyzing device 140.

Figure 2B:
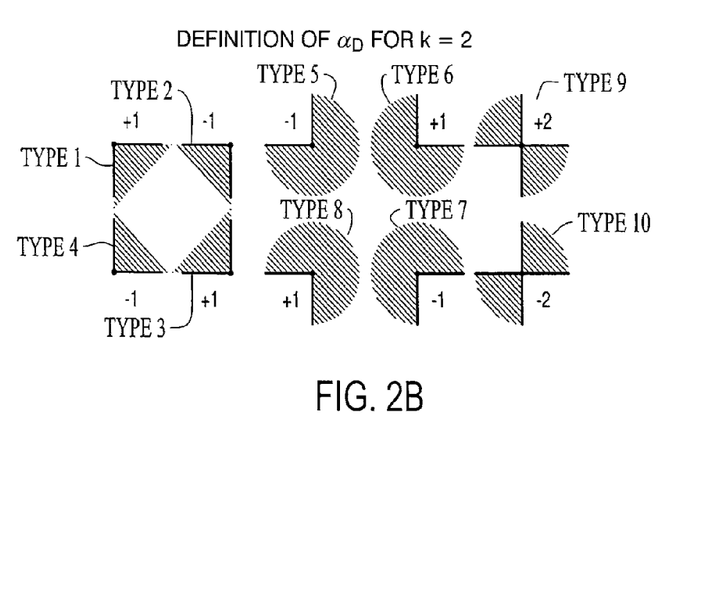

The corner analyzing device 140 can receive the generalized rectangular region from the target region recognition device 130 and can inspect the corners of the generalized rectangular region D to evaluate the corners according to a predetermined corner characterization function. The corner characterization function can be used to assign values to each corner point on the generalized rectangular region based on the type of each corner. The corner characterization function can depend on the dimension k and the scan-line used to create the cumulative image representation. FIG. 2B illustrates the corner characterization function a for a planar region D (k=2), which is defined based on image data that is scanned from left-to-right to create a cumulative image representation where each point in region D includes cumulative image information that holds a value of image data points above and to the left of the data point, as well as a value of the data point.

For a planar region D, a generalized rectangular region can have the 10 different types of corners illustrated in FIG. 2B. In FIG. 2B, the shaded region represents the interior of the generalized rectangular region. For the planar region, the corner points can each be assigned a +1 or −1 value, or a +2 or −2 value. The ±2 value represents two corners of the region that meet at one point. The corner characterization function can also be configured so that each of the corners that meet at one point can be counted separately as (−1, −1) or (+1, +1), thus eliminating the ±2 values. The predetermined corner characterization function labeled $\alpha_D$ in FIG. 2B can be considered a function that is applied to the entire region D where $\alpha_D$ assumes non-zero values only at the corners. The corner analyzing device 140 can inspect the corners of region D in order to evaluate $\alpha_D$. Thus, for the case discussed above, $\alpha_D(x) \in \{0, \pm 1, \pm 2\}$, where the non-zero values exist only at the corners.

As can be seen in FIG. 2A, the corner analyzing device analyzes each corner of the polygonal region D and assigns each corner in region D the appropriate value depending on the function $\alpha_D$. For example, in FIG. 2A, the corner points of generalized region D can be inspected starting with the upper left corner and proceeding clockwise along the perimeter of the region. Thus, for example, as shown in FIG. 2A, corner 201 corresponds to a Type 1 corner in $\alpha_D$, corner 202 corresponds to a Type 5 corner, corner 203 corresponds to a Type 2 corner, corner 204 corresponds to a Type 9 corner and corner 205 corresponds to a Type 8 corner. The other corners in region D are labeled similarly, where each corner corresponds to one of the 10 predefined types of corners illustrated in FIG. 2B.

The function $\alpha_D$ depends on the dimension k of the polygonal region D. A function $\alpha_D$ for non-planar dimensions can be derived based on the above-principles.

Figure 3A:
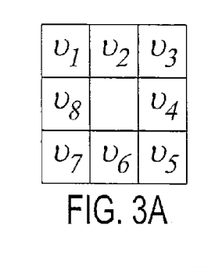
FIGS. 3A-3C are diagrams illustrating an exemplary process for recognizing corner points and characterizing corner types for a planar image region.
Figure 3B:
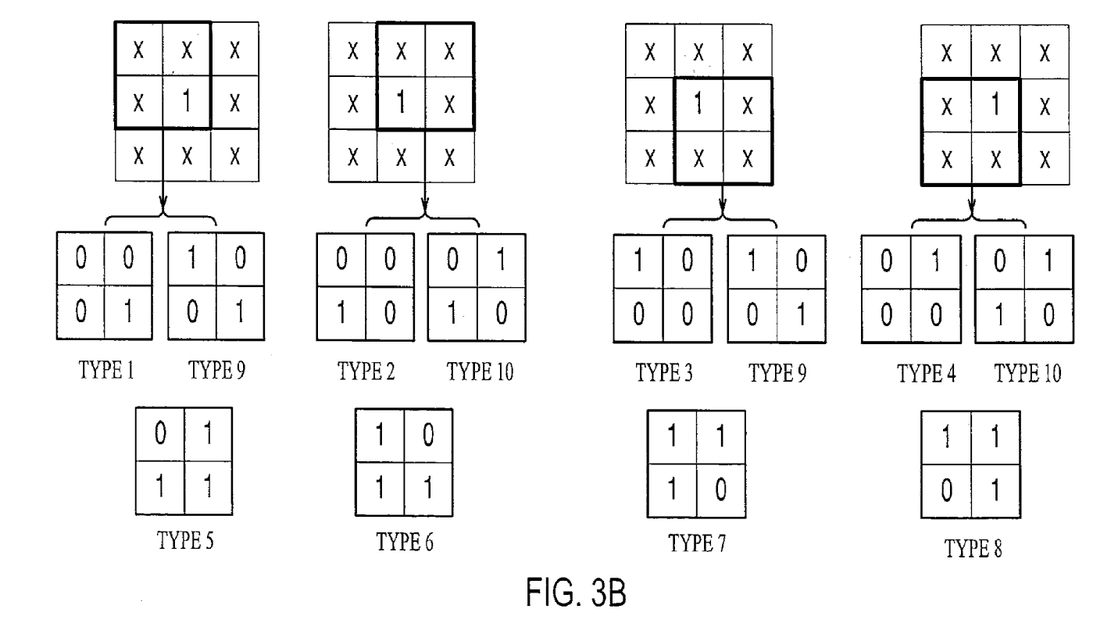
Figure 3C:
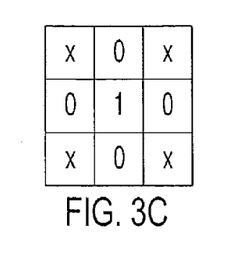

The corner analyzing device 140 can recognize whether a pixel of an image representation is a corner, and if so, can determine what type of corner it is. For example, in the planar case, the corner analyzing device 140 can determine for each pixel whether it is a corner and, if so, which of the 10 types of corners it belongs to. One embodiment illustrating the implementation of the corner analyzing device is illustrated in FIGS. 3A-3C. A 3×3 template can be imposed over a given pixel position (x, y). For a given pixel with label i, the labels of the neighboring eight pixels can be considered. If a neighboring pixel has a label I, such that it is part of the region, the corresponding template position is filled with a value of "1" and otherwise "0". The pixel of interest in the center is always considered to be "1". For a given template, that can be defined by values $v_1, \ldots, v_8$ as shown in FIG. 3A, there may be a total of 256 different patterns. Each pattern can be determined and indexed into a lookup table having a size of 256. For the planar case, a pixel (x, y) can belong one of the 10 types. Thus, the lookup table can be constructed as follows. Given a 3×3 template, the four 2×2 corners can be considered which are shown in FIG. 3B by the regions boxed with thick lines. For the top-left corner if the set of $(v_8, v_1, v_2)=(0, 0, 0)$ then point (x, y) is a corner Type 1 shown in FIG. 2B. Similarly, for $(v_8, v_1, v_2)=(1, 0, 1)$ then point (x, y) is a corner Type 5. Thus, the 10 corner types can be classified and entered into a lookup table as shown in FIG. 3B.

A special check can be performed to verify whether pixel (x, y) is an isolated point. This can be checked by determining whether the 3×3 template is like the one illustrated in FIG. 3C. In such cases, it is faster to directly compute the local image statistic, such as the local histogram rather than using the integral histogram representation.

Referring back to FIG. 2A, once the corner analyzing device 140 identifies the types of corners in region D, and assigns values to the corners based on the type of corner, the values of the corners points and the generalized rectangular region can be transmitted to the computation device 150. The computation device 150 can use the values of the corner points and the cumulative image data at the corner points are used to calculate the image statistics over the target region. In an exemplary embodiment, calculation of the image statistics in the computation device 150 can be described below.

As background, the aggregate function propagated in propagation device 120, such as integral image or integral histogram computations, can be generalized to any function $f(x)$, such that $f(x): R^k \to R^m$ with antiderivative $F(x)$. For a a simple 2D case (i.e k=2) of a rectangular region D, the following equation can be written for the integral $$\int_D f(x)\,dx = F(x_1) - F(x_2) + F(x_3) - F(x_4) \quad (2)$$

Similar equations can be written for k>2. Additionally, if x is a uniformly distributed random variable and $E[\cdot|D]$ denotes the expectation where x is constrained to assume values in D, then one can write the expression of simple statistics, such as the mean of $f(x)$ over D $$E[f(x)|D] = \frac{1}{D}\int_D f(x)\,dx, \quad (3)$$

or the covariance of f(x) over D:

$$E[(f(x) - E[f(x)|D])(f(x) - E[f(x)|D])^T | D] = \quad (4)$$

$$\frac{1}{D}\int_D g(x)\,dx - \frac{1}{D^2}\int_D f(x)\,dx \int_D f(x)^T\,dx,$$

where $g(x): R^k \to R^{m \times m}$ is such that $x \to f(x)f(x)^T$. Similarly, higher-order moments can be written in this matter.

Expressions (3) and (4) can assume very different meanings depending on the choice of $f(x)$. For instance, for the integral image they represent mean and covariance of the pixel intensities over the region D. On the other hand for the integral histogram, equation (3) is the histogram of the pixels of region D, according to quantization q. What those expressions share is the fact that the integral operation can be substituted with the result of Equation (2).

An integral image statistic can be calculated in the computation device 150 over the generalized rectangular region by summing up the values of the product of F(x), determined in the propagation device 120, and the values based on $\alpha_D$, determined in the corner analyzing device 140.

An exemplary process for this calculation can be described as follows: $D \subset R^k$ can be a generalized rectangular region where the boundary $\partial D$ is made of a collection of portions of a finite number of hyperplanes perpendicular to one of the axes of $R^k$. If $\nabla \cdot D$ indicates the set of corners of a generalized rectangular region D, then $$\int_D f(x)\,dx = \sum_{x \in \nabla D} \alpha_D(x) F(x), \quad (5)$$

where $\alpha_D: R^k \to Z$, is a map that depends on k. For k=2, $\alpha_D(x) \in \{0, \pm 1, \pm 2\}$, according to the which of the types of corners x belongs to. Thus if D is a generalized rectangular region, the integral of $f(x)$ over D can be computed in constant time. This can be done by summing up the values of F(x), computed at the corners $x \in \nabla \cdot D$, and multiplied by $\alpha_D(x)$, which depends on the type of corner. Therefore, for any discrete region D, statistics over region D can be computed in constant time simply by inspecting the corners to evaluate $\alpha_D$.

According to the present disclosure, Equation 1 defined above in connection with the integral image computation can be extended from simple rectangular regions (FIG. 7) to compute statistics over regions of non-simple rectangular polygonal shapes by using the expression in Equation 5.

The computational complexity to evaluate K features over generalized rectangular regions with Q pixels and W corners, out of an image of N×N pixels, is O(KQ) if it is computed with the original image representation, and is $O(N^2+KW)$ if it is computed with the integral image representation using Equation 5. Typically, W is much smaller than Q. When K is large, it is therefore more efficient to evaluate features using the integral image representation the simply by using the original image.

In one embodiment, the framework described above can be used to calculate region based image features to re-identify a person or object in a plurality of images, as described in greater detail in the co-pending application entitled "Image Processing for Person or Object Re-identification." As described therein, shape labeled image and an appearance labeled image can be created from inputted image data. The shape labeled image can be created by assigning a shape label to each pixel based on an attribute of the pixel that is characteristic of the shape of the part of the person or object that is captured by the pixel. Similarly, the appearance labeled image can be created by assigning an appearance label to each pixel based on an attribute of the pixel that is characteristic of the appearance of the pixel data. The shape labeled image and appearance labeled image can be processed to compute an occurrence matrix that can be used as an identifying descriptor for a person or object in the image. Re-identification can be used in security applications, forensic applications, for identifying missing people, and for tracking people or objects in crowded environments such as mass transit and airports. The calculation of image statistics over generalized regions based on the appearance labeled image and shape labeled image can be greatly simplified by using the approaches described above. In one embodiment, calculating image statistics over generalized rectangular regions in a shape labeled image and an appearance labeled image is described in greater detail with reference to FIG. 4.

Figure 4:
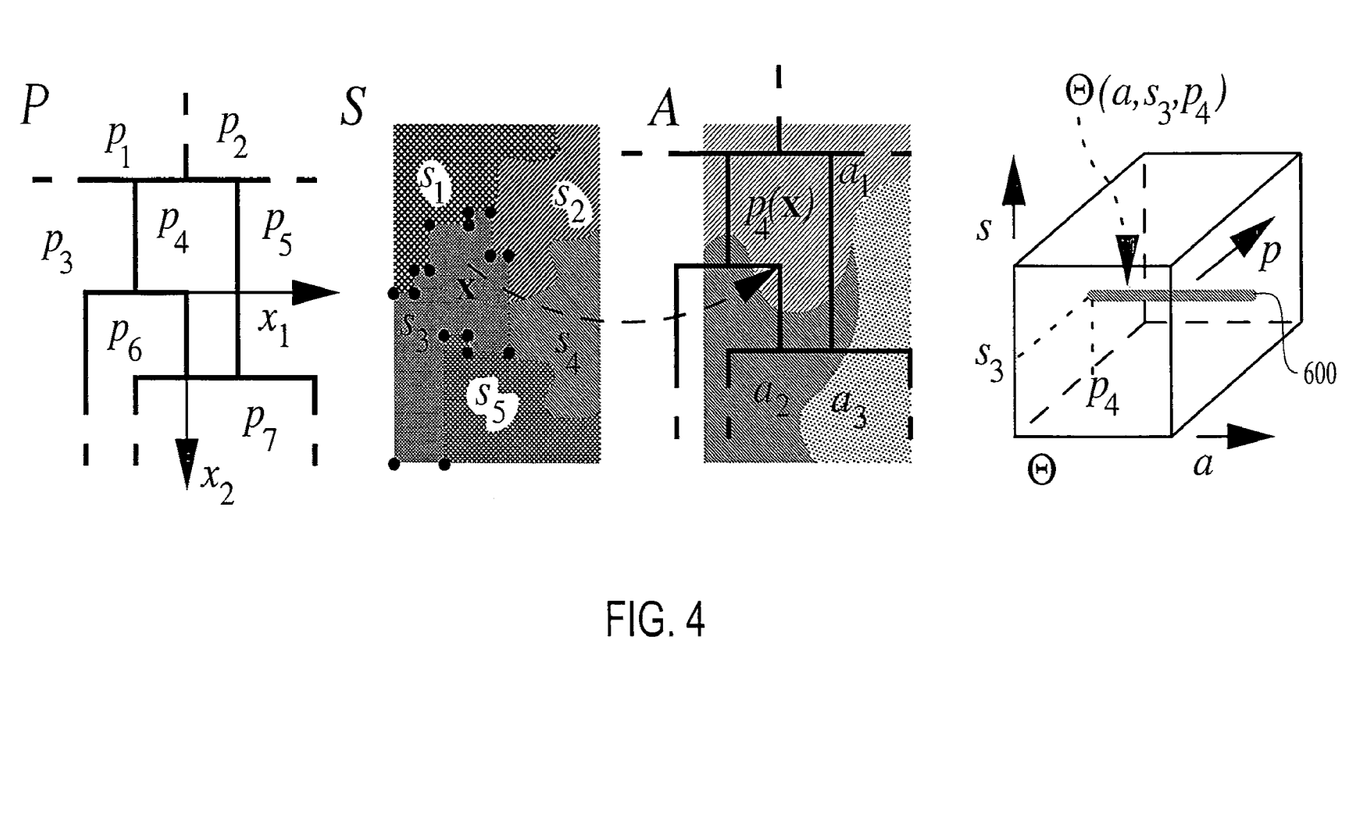
FIG. 4 is a diagram illustrating a calculation of a shape and appearance context descriptor of an image in one embodiment.

In FIG. 4, P represents a mask including partitions $p_1$-$p_1$. The mask P is placed over appearance labeled image A having appearance labels $a_1.a_m$. As shown, S represents a shape labeled image with labels $s_1$-$s_N$, and $\Theta(a, s, p)$ represents the part of the descriptor corresponding to the particular appearance label a, the particular shape label s, and the particular L-shaped region p. $\Theta$ represents the overall shape and context descriptor used to identify the person or object captured in image I.

If image I contains a person or object of a given class, A can be its appearance labeled image, and S (defined over $\Lambda$) can be its shape labeled image, where pixel labels are meant to identify regions of image I occupied by specific parts of the object. The descriptor $\Theta$ may be determined as follows. S: $\Lambda \rightarrow S$ and A: $\Lambda \rightarrow A$ are two functions defined on a discrete region $\Lambda$ of dimensions M×N, and assuming values in the label sets $S=\{s_1, \ldots, s_n\}$ and $A=\{a_1, \ldots, a_m\}$ respectively. Also, $P=\{p_1, \ldots, p_l\}$ is a partition such that $\cup_i p_i$ represents the plane, and $p_i \cap p_j = 0$, if $i \neq j$. If $p \in P$ and x a point on the plane x, $p(x)$ can be defined $p(x)=\{x+y|y \in p\}$, and $h(a, p(x))=P[A(y)=a|y \in p(x)]$ can represent the probability distribution of the labels of A over the region $p(x)$, where P is a probability measure.

In other words, for a given A, and a randomly selected point $y \in p(x)$, the probability that the label at that point will be a is given by $h(a, p(x))$. For example, in FIG. 4, if $h(a, p_4(x))$ is the normalized count of the labels of A in $p_4(x)$, which represents the probability distribution of labels A over the region $p(x)$, then by averaging $h(a, p_4(x))$ over all $x \in \{y|S(y)=s_3\}=D_{s3}$, $\Theta(a, s_3, p_4)$ can be obtained, which is line 600 in FIG. 4.

Also, if $D_s=\{x|S(x)=s\}$, $s \in S$, the occurrence function can be defined as follows. The occurrence function $\Theta$: $A \times S \times P \rightarrow R_+$ can be defined such that point (a, s, p) maps to $$\Theta(a, s, p) = E[h(a, p(x))|D_s] = \frac{1}{D_S}\int_{D_s} h(a, p(x))dx \qquad (6)$$

If x is a uniformly distributed random variable, $E[\cdot|D]$ denotes the statistical expectation where x is constrained to assume values in D. For example, the computation of the mean and covariance can describe the notation of expectation $E[\cdot|D]$.

$\Theta$ computed over S and A is an m×n×l matrix. $\Theta$ can be a collection of values corresponding to all the points of the region A×S×P which is referred to sometimes herein as the occurrence matrix. The occurrence matrix can be used as a unique identifying descriptor for each part or region $D_s$ because, given S and A, for a randomly selected point $x \in D_s$, the probability distribution of the labels A over the region $p(x)$ of A can be represented by $\Theta(\bullet, s, p)$.

For an image having N×N image, the computation complexity to calculate $\Theta$ using conventional methods is $O(N^4)$. Such computation cost is considered impractical for real-time evaluation of image statistics. However, using the procedures outlined above in the pending application, the computation cost can be greatly reduced by identifying and characterizing the corner points for the generalized rectangular partitions p, and identifying and characterizing the corner points of the generalized rectangular shape labeled regions s. Specifically, calculation of the occurrence function $\Theta$ can be simplified according to the following equation:

$$\Theta(a, s, p) = |D_s|^{-1}|p|^{-1}\sum_{x \in \nabla \cdot D_s, y \in \nabla \cdot p}\alpha_{D_s}(x)\alpha_p(y)G(a, x+y), \qquad (7)$$

where, $$G(\cdot, x) = \int_{-\infty}^{x}\int_{-\infty}^{u} e \cdot A(v)dv\,du, \qquad (8)$$

and e: $A \rightarrow N^m$ is such that a label $a_i \in A$ is mapped to $e_i$, where $e_i$ is the unit vector with only the i-th component different then 0, and therefore, the inner integral is the integral histogram of A. Note that $a \in A$ is intended to index one of the elements of the m-dimensional vector $G(\bullet, x)$. $\nabla \cdot D_S$ indicates the set of corners of a generalized rectangular shape labeled region s, and $\nabla \cdot p$ indicates the set of corners of a generalized rectangular partition from the mask.

Thus, based on Equations 7 and 8 the occurrence matrix can be calculated efficiently using Algorithm 1, below:

---

Algorithm 1: Fast occurrence computation 1  begin
2     Use (7) to compute G from a single pass inspection of A
     // Compute $|D_s|$ $\alpha_{D_s}$ and $\nabla \cdot D_s$
3     foreach $x \in \Lambda$ do
4       $|D_{S(x)}| \leftarrow |D_{S(x)}| + 1$
5       if IsCorner (x) then
6         Set $\alpha_{D_{S(x)}}(x)$
7         $\nabla \cdot D_{S(x)} \leftarrow \nabla \cdot D_{S(x)} \cup \{x\}$
     // Use (6) to compute $\Theta$
     // $|p|$ $\alpha_p$ and $\nabla \cdot p$ known a priori
8     foreach $s \in S$ do
9       foreach $p \in P$ do
10        foreach $x \in \nabla \cdot D_s$ do
11          foreach $y \in \nabla \cdot p$ do
12            $\Theta(\bullet, s, p) \leftarrow \Theta(\bullet, s, p) +$
13              $\alpha_{D_s}(x)\alpha_p(y)G(\bullet, x+y)$
14        $\Theta(\bullet, s, p) \leftarrow |D_s|^{-1}|p|^{-1}\Theta(\bullet, s, p)$
15    return $\Theta$
16  end

---

Data: Functions A and S
Result: Occurrence matrix $\Theta$

The computation cost of Equation 7 is $O(N^2+C_sC_p)$, which is generally $O(N^2)$ in practice because $C_sC_p$ is of the same order of $N^2$.

Figure 5:
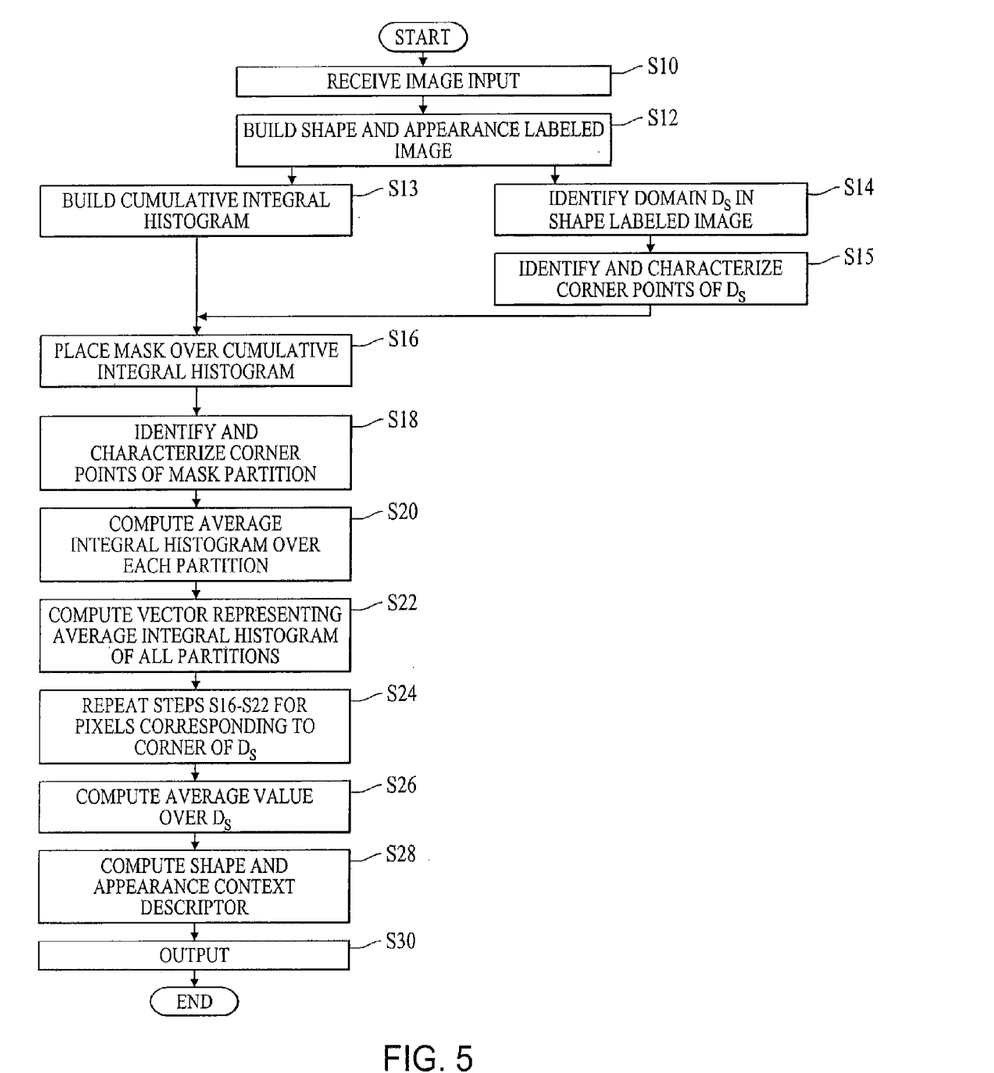
FIG. 5 is a flow chart illustrating an exemplary process for calculating a shape and appearance context descriptor in one embodiment.
Figure 6A:
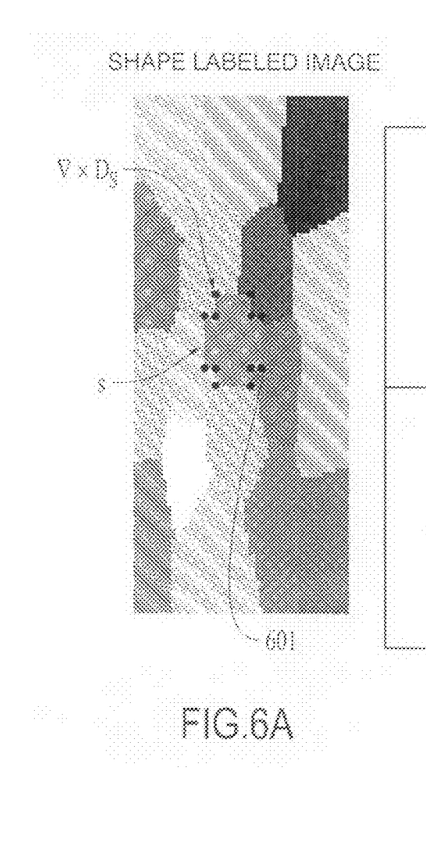
FIG. 6A-6C are schematic diagrams illustrating an efficient process for computing a shape and appearance context descriptor in one embodiment.
Figure 6B:
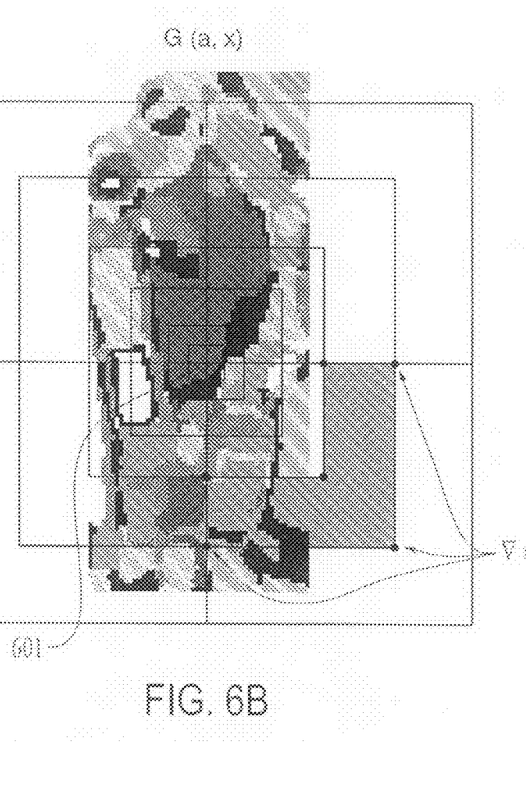
Figure 6C:
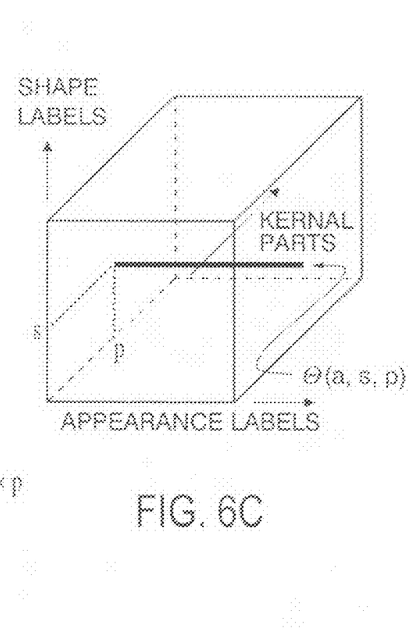

FIGS. 5-6C illustrate an operation of an exemplary image statistic computation device used to calculate an identifying descriptor of a person or object based on Algorithm 1. Referring to FIG. 5, during operation of an exemplary image statistic computation device, the process can begin and proceed to step S10 where an image input can be received. A shape labeled image and an appearance labeled image can be created in step S12.

The appearance labeled image is out put in step S12, and during operation of a propagation device, a cumulative integral histogram representation of the appearance labeled image is calculated based on a single-pass inspection of the appearance labeled image in step S13. The propagation device outputs the cumulative integral histogram.

The shape labeled image is output from step S12, and during operation of a target region recognition device, the shape labeled image can be analyzed in step S14 to identify a generalized rectangular region $D_S$ that corresponds to a group of pixels having the same shape label. During operation of a corner analyzing device, the generalized rectangular region $D_S$ can be analyzed in step S15 to identify and characterize corner points of region $D_S$. A value can be assigned to each of the corner points of $D_S$ based on the type of each corner and a predetermined corner characterization function.

In step S16, during operation of a second target region recognition device, the cumulative integral histogram is received and a mask having a plurality of partitions can be placed over a pixel in the cumulative integral histogram. The mask can be placed over a pixel 601 that corresponds to a corner point pixel of $D_S$, as illustrated in FIGS. 6A and 6B. During operation of another corner analyzing device, the corner points of each mask partition can be identified and characterized in step S18. The mask can include partitions with a predetermined shape, such that the corner points of each partition can be identified and characterized beforehand.

During operation of a computing device, the average integral histogram over each partition that is placed over the cumulative integral histogram can be calculated in step S20 based on the cumulative integral histogram at each corner point of the partition and the type of each corner. In step S22, a vector can be calculated for the pixel that the mask was centered over, where the vector represents the average integral histograms for all of the partitions in the mask.

In step S24, the process steps described in steps S16-S22 can be repeated for each pixel of the cumulative integral histogram representation that corresponds to a corner point of $D_S$, such that the mask is superimposed over each pixel corresponding to a corner point of $D_S$. In step S26, the average values of the vectors calculated in step S22 over region $D_S$ can be calculated based on the value of the vector and the type of corner of $D_S$ that was determined in step S15.

To calculate a shape and appearance context descriptor that can be used to identify a person or object in the image, the steps of S15-S26 can be repeated for each region in the shape labeled image to calculate the occurrence matrix $\Theta$ shown in FIG. 6C, which represents the co-occurrence of shape labels, appearance labels, and partitions. The image statistic computation device can output the descriptor in step S30 to a memory unit that can store the descriptor. The descriptor can be subsequently recalled from the memory unit and compared to a newly inputted image to later re-identify the person or object. The process illustrated in FIG. 5 can be implemented by a computer.

The process described above illustrates an exemplary embodiment of a process used to calculate region based image features for determining an identifying descriptor of a person or object in an image. The image statistic computation device and method can also be exploited in any application where it is desired to calculate region based image features. Some examples of useful applications include face detection engines for people detection and tracking, and medical imaging detection and recognition applications.

While the disclosed methods and systems have been described in conjunction with exemplary embodiments, these embodiments should be viewed as illustrative, not limiting. It should be understood that various modifications, substitutes, or the like are possible within the spirit and scope of the disclosed devices, methods and systems.

What is claimed is:

1. An image statistic computation device for computing region-based image statistics of an inputted image, the device comprising:
    a propagation device that is configured to produce a cumulative image representation by propagating an aggregate function through image data from the inputted image, where each data point in the cumulative image representation includes cumulative image information that is based on a value of previously propagated adjacent points as well as a value of the data point;
    a target region recognition device that is configured to identify at least one generalized rectangular region from the cumulative image representation;
    a corner analyzing device that is configured to identify corners of the identified generalized rectangular regions, and characterize each corner as one of predefined corner types, the predefined corner types including at least an interior region of 90° angle formed by two lines, an exterior region of 270° angle formed by two lines, and an intersection region of a pair of 90° angles formed by two crossing lines; and
    a computation device that is configured to compute statistical information over the identified generalized rectangular regions based on the type of each corner and the cumulative image information at each corner.

2. The image statistic computation device according to claim 1, wherein the corner analyzing device assigns each corner of the generalized rectangular region a value based on the type of corner.

3. The image statistic computation device according to claim 2, wherein the computation device computes statistical information over the at least one generalized rectangular region by summing, for each corner of the at least one generalized rectangular region, the product of the value assigned to each corner and the cumulative image information at each corner.

4. The image statistic computation device according to claim 2, wherein the corner analyzing device assigns each corner of the generalized rectangular region a value selected from the set $\{0, \pm 1, \pm 2\}$.

5. The image statistic computation device according to claim 2, wherein the corner analyzing device assigns each corner of the generalized rectangular region a value selected from the set $\{0, \pm 1\}$.

6. The image statistic computation device according to claim 1, wherein the corner analyzing device characterizes each corner as one of ten predefined corner types.

7. The image statistic computation device according to claim 1, wherein the corner analyzing device characterizes each corner as one of eight predefined corner types.

8. The image statistic computation device according to claim 1, wherein the aggregate function is an integral image function.

9. The image statistic computation device according to claim 1, wherein the aggregate function is an integral histogram function.

10. The image statistic computation device according to claim 1, wherein the propagation device propagates the aggregate function through the image data on a pixel-by-pixel basis.

11. The image statistic computation device according to claim 10, wherein the inputted image is a two dimensional image and the propagation device propagates the aggregate function by scanning the image data in a direction from left-to-right.

12. The image statistic computation device according to claim 1, wherein the image statistic computation device is configured to calculate region-based image statistics from a two-dimensional image.

13. The image statistic computation device according to claim 1, wherein the image statistic computation device is configured to calculate region-based image statistics from a three-dimensional image.

14. The image statistic computation device according to claim 1, wherein the target region recognition device is configured to identify a generalized rectangular region having an L-shape from the cumulative image representation.

15. The image statistic computation device according to claim 1, wherein the target region recognition device is configured to identify a generalized rectangular region from the cumulative image representation, where the region is defined by pixels that have a common attribute.

16. The image statistic computation device according to claim 1, further comprising:
a pre-processing device that is configured to convert RGB image data from the inputted image into other data formats.

17. The image statistic computation device according to claim 1, further comprising:
a pre-processing device that is configured to convert image data from the inputted image into an appearance labeled image where each data point is assigned a label based on an appearance attribute.

18. The image statistic computation device according to claim 1, further comprising:
a pre-processing device that is configured to convert image data from the inputted image into a shape labeled image where each data point is assigned a label based on a shape attribute.

19. A method for computing statistical information over a region of an image, the method comprising:
receiving image data of an inputted image;
producing a cumulative image representation by a processor configured to propagate an aggregate function through the image data, where each data point in the cumulative image representation includes cumulative image information that is based on a value of previously propagated adjacent points as well as a value of the data point;
identifying a generalized rectangular region in the cumulative image representation;
identifying corners of the generalized rectangular region;
characterizing each corner as one of a predefined corner type;
assigning a value to each corner based on the type of each corner;
computing statistical information over the identified generalized rectangular region based on the value assigned to each corner and the cumulative image information at each corner;
calculating a shape labeled image from the image data;
identifying a second generalized rectangular region in the shape labeled image;
identifying corners of the second generalized rectangular region, and characterizing each corner as one of a predefined type;
identifying data points of the cumulative image representation that correspond to the corners of the second generalized rectangular region; and
calculating a second image statistic over the second generalized rectangular region based on the type of each corner of the second generalized rectangular region and the first image statistic calculated at each data point of the cumulative image representation that corresponds to a corner of the second generalized rectangular region.

20. The method according to claim 19, further comprising:
summing, for each corner of the identified generalized rectangular region, the product of the value assigned to each corner and the cumulative image information at each corner.

21. A method for calculating an identifying descriptor for a person or object in an image, the method including:
receiving image data from an inputted image;
calculating an appearance labeled image from the image data;
producing a cumulative image representation of the appearance labeled image by a processor configured to propagate an aggregate function through the appearance labeled image, where each data point in the cumulative image representation includes cumulative image information that is based on a value of previously propagated adjacent points as well as a value of the data point;
identifying a first generalized rectangular region in the cumulative image representation;
identifying corners of the first generalized rectangular region, and characterizing each corner as one of predefined types, the predefined corner types including at least an interior region of 90° angle formed by two lines, an exterior region of 270° angle formed by two lines, and an intersection region of a pair of 90° angles formed by two crossing lines;
calculating a first image statistic over the first generalized rectangular region based on the type of each corner and the cumulative image information at each corner.

* * * * *